United States Patent
De Pierre et al.

[15] 3,693,419
[45] Sept. 26, 1972

[54] COMPRESSION TEST

[72] Inventors: Vincent De Pierre, Dayton, Ohio; Alan T. Male, Export, Pa.; George Saul, Dayton, Ohio

[73] Assignee: The United States of America as represented by the Secretary of the Air Force

[22] Filed: Dec. 30, 1970

[21] Appl. No.: 102,583

Related U.S. Application Data

[63] Continuation-in-part of Ser. No. 64,536, Aug. 14, 1970, abandoned.

[52] U.S. Cl. ........................................... 73/89, 73/94
[51] Int. Cl. .............................................. G01n 3/08
[58] Field of Search ...................... 73/141 R, 89, 94

[56] References Cited

UNITED STATES PATENTS

| | | | |
|---|---|---|---|
| 3,490,273 | 1/1970 | Warfield et al. | 73/94 X |
| 3,554,019 | 1/1971 | Van Den Hove et al. | 73/89 |
| 2,482,147 | 9/1949 | Bashore | 73/94 |

*Primary Examiner*—Jerry W. Myracle
*Attorney*—Harry A. Herbert, Jr. and Arthur R. Parker

[57] ABSTRACT

A combined true stress-strain data-generating testing technique, and method for determining unknown loads applied in compression to relatively thin, metallic and ring-shaped test specimens by means of flat die platen members. Both the die friction component $\Delta D$ of the total applied load and the percent deformation $\Delta T$, or true strain of the ring specimen, as well as the unknown compression load, may be determined respectively from the change in shape or inside diameter and thickness of the deformed specimen. From a plot between the previously computed deformation, $\Delta T$, or true strain, and die friction component, $\Delta D$, the ratio between the total pressure applied to the specimen and the true flow stress may be computed from the total pressure required to overcome the previously found die friction component, $\Delta D$. A true stress-strain curve may be plotted from values found in testing a number of specimens under various loads, and the load being applied may be found, when the basic flow behavior of the material under test is known.

2 Claims, 11 Drawing Figures

PATENTED SEP 26 1972 3,693,419

INVENTORS
VINCENT DEPIERRE
ALAN T. MALE
GEORGE SAUL
BY Harry A. Herbert Jr.
ATTORNEY
Arthur R. Parker
AGENT

COMPRESSION TEST

BACKGROUND OF THE INVENTION

The present application is a continuation-in-part application of applicants' copending patent application, Ser. No. 64,536 filed Aug. 14, 1970, and entitled "A New Method of Determining a Compression True Stress-Strain Curve." The latter application was abandoned on Oct. 6, 1971.

The instant invention relates generally to the use of a ring-shaped test specimen constituting a load cell and used both in a new technique for generating true stress-strain data resulting from compression tests on selected metallic materials and involving the accurate simulation of metal working conditions such as in the forging of high strength metals and alloys, and in the determination of unknown compression loads being applied to such materials when the basic flow properties thereof are already known.

For the adequate mathematical understanding of metal working processes and the theoretical prediction of deformation loads, there exists a precise need for accurate knowledge of the basic flow stress behavior of the workpiece material under study for particular conditions of temperature and strain rate. One method of obtaining the desired data is by the technique known as compression testing. However, this method has been previously afflicted with the phenomena known as die friction and "barrelling," the former being very difficult to isolate. These two problems have had the effect of introducing large errors in the test specimen. In one such method, a cylindrical specimen is initially compressed a small amount and thereafter remachined to remove any "barrelling" effect resulting therefrom. This technique is repeated over and over again for relatively small increments of the total load until the process is completed. Thus, by periodically remachining the test specimen, a predetermined height-to-diameter ratio may be maintained which, in turn, has resulted in minimizing the aforementioned die friction, the latter being thereafter assumed to be negligible.

In the normal upsetting of the aforementioned cylindrical-type of test specimen, the deformation stress is composed of both the stress necessary to overcome friction at the tool/specimen interface, which constitutes the previously mentioned die friction, and the further stress caused by nonhomogeneous deformation, in addition to the basic flow stress of the specimen material, the latter being required for a proper analysis of the particular material under study. However, when a predetermined height-to-diameter ratio is maintained, as has been accomplished in he aforesaid cylindrical method, both the friction caused at the tool/specimen interface and the stress caused by non-homogeneous deformation have been previously successfully eliminated. In this regard, although the aforesaid cylindrical specimen testing technique has proven to be relatively accurate, it is actually very tedious and time-consuming in operation, and, moreover, is effective only at relatively low strain rates and ambient temperatures.

In order to secure basic flow stress data on the resistance of a selected material to deformation in compression at elevated temperatures and relatively high strain rates, it has been the previous practice to minimize both the aforementioned frictional and nonhomogeneous deformation effects through use of the judicious choice of the initial specimen geometry and by means of lubrication of the test specimen, and then assuming that these effects are nonexistant or negligible. However, data generated under these conditions may be in error by as much as 30%. Therefore, to eliminate or, at least substantially reduce, such errors and thus provide for the more accurate determination of the basic flow stress behavior of selected metals and/or alloys in a reduced time interval, as well as to enable the determination of an unknown deformation load being applied thereto when the said basic flow stress behavior thereof is known, the simplified and yet unique method of the present invention has been developed, which method will be hereinafter described in the following summary and detailed description thereof.

SUMMARY OF THE INVENTION

The present invention consists briefly in a new and novel technique for obtaining both the basic flow stress data of, and/or unknown loads being applied to, selected metals and alloys by placing a test specimen of the selected material in compression, and then measuring its change in inside diameter and overall deformation. The specimen is made relatively thin and of a ring-shaped configuration, and is further fabricated with any of a number of predetermined shape ratios between its outside diameter, inside diameter and thickness or height. This ratio is initially selected to minimize the normal barrelling effect resulting in the specimen while undergoing a compression load. Thereafter, in one application of the present invention, by accurately measuring the changes in both specimen thickness and in the shape of its central opening resulting from its deformation under compression from a known load, the flow stress of the selected material at a particular strain and deformation may be mathematically computed. A stress-strain curve may then be constructed by repeating the present technique for a number of different ring specimens compressed to different strains. In a second application of the invention, the same dimensional changes of the test specimen after deformation under load may be used to actually determine the load being applied, when the basic flow stress of the material being compressed is already known or determinable.

Other objects, as well as advantages of the invention will become readily apparent from the disclosure thereof, to be set forth hereinbelow and taken in connection with the accompanying drawings, in which:

BRIEF DESCRIPTION OF THE DRAWINGS

FIGS. 4 and 4a and 5 and 5a represent further plan and side elevational views, respectively, of a second and third test specimen each incorporating a different shape ratio and which were tested to reduced sizes in a manner similar to that of FIGS. 2 and 2a;

DESCRIPTION OF THE PREFERRED EMBODIMENT

Figure 1:
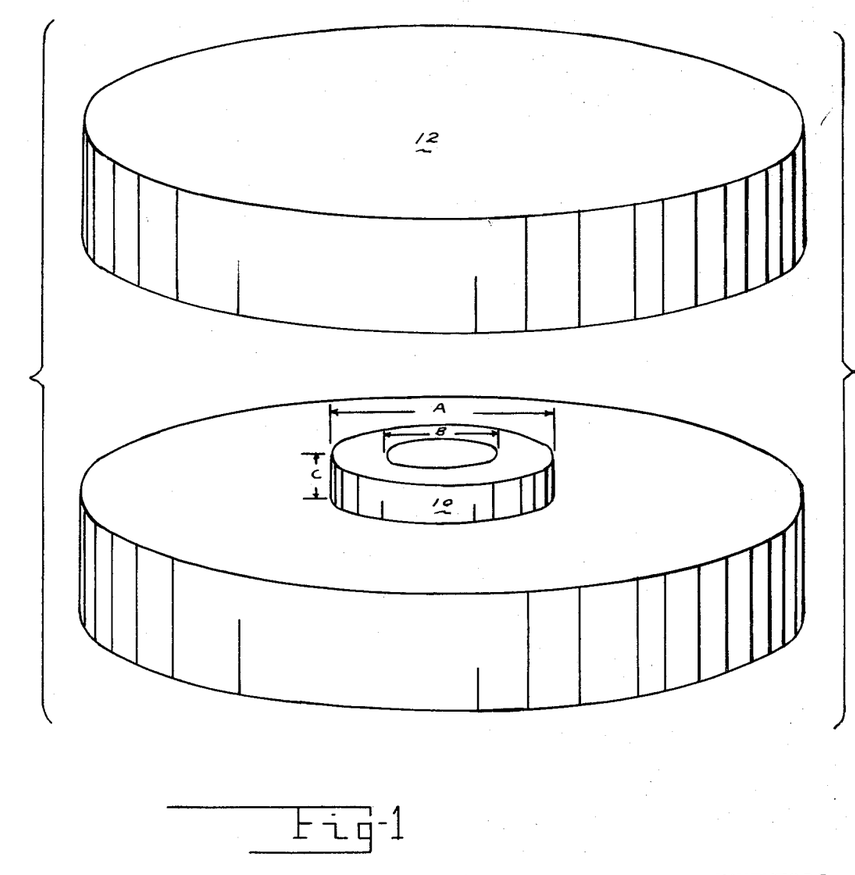
FIG. 1 is an overall schematic and enlarged view in perspective, illustrating a basic example of the ring-shaped test specimen of a type to which the improved technique of the present invention may be applied, and further showing the said specimen mounted between upper and lower compression members that may constitute the die platens of a standard compression machine.

Referring generally to the drawings and, in particular, to FIG. 1 thereof, one example of the ring-shaped, test specimen to which the improved method of the present invention may be adapted is indicated generally at 10 as being positioned in supporting relation on a first platen member 11, which constitutes the bottom one of a pair of identical platen members, the second or upper one of which being indicated generally by the reference numeral 12. The specimen 10 may be selected from any metallic material so long as it is capable of plastic deformation. Platen members 11, 12 may constitute the compression dies of a standard compression machine (not shown). Although the overall size of the ring test specimen 10, as well as the alternative ring forms to be discussed hereinafter, is not critical per se since it can be small or large to fit the requirements and limits of a particular test, the relative shape or shape ratio of the ring is critical in that the ratio between its outside and inside diameters, indicated at A and B in the aforementioned FIG. 1 and its thickness or height at C must be tailored to fit the mathematical friction measurement formula (to be further referred to hereinafter with regard to a sample computation), or, alternatively, the formula to be used must be modified. A shape that may be particularly applicable to the present invention may be that represented in FIGS. 2 and 2a generally at the reference numeral 13. The latter may, in one configuration thereof, consist of a relatively thin flat element incorporating an outside diameter, indicated at the peripheral surface portion 13a, an inside diameter, at the surface portion 13b, and a thickness or height, denoted generally at 13c, of a nominal ¾ × ⅜ ×⅛ inch, giving an overall shape ratio to the test specimen of 6:3:1 when in its unloaded and/or deformed condition.

Figure 2:
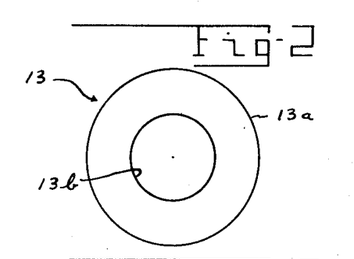
FIGS. 2 and 2a respectively represent enlarged plan and side elevational views used to illustrate further details of one type of test specimen similar to that shown in the view of FIG. 1 but having an initial predetermined shape ratio shown in its uncompressed conditions.
Figure 2A:
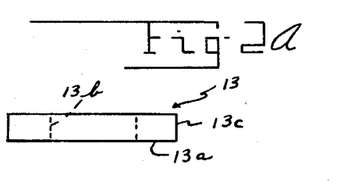

In accordance with the teaching of the present invention, the above-noted shape ratio of the ring-shaped test specimen 13 inherently acts to minimize the previously mentioned unfavorable barrelling effect normally resulting from alternative techniques involved in the testing of selected metals and alloys for resistance to deformation. Moreover, although the die friction component resulting at the die or platen/specimen interface is large, it can now be computed from the change in shape of the hole in the test specimen or ring member 13 from use of the formula listed below as follows:

$$\text{Percent } \Delta D = \frac{\text{Original I.D.} - \text{Final I.D.}}{\text{Original I.D.}} \times 100$$

The 100 factor naturally permits the percent notation. Next, the percent deformation, $\Delta T$, as determined from the thickness or height of the test specimen 13 may be determined from the following formula:

$$\text{Percent } \Delta T = \frac{\text{Original thickness} - \text{Final thickness}}{\text{Original thickness}} \times 100$$

The above-mentioned percent $\Delta D$ and $\Delta T$ values may then be plotted on a precalculated curve theoretically determined for any possible combination of the two values, and the previously-noted die friction component found at the intersection therebetween. The friction factor or component found in this manner is termed the $m$ value, or classically, is known as the interface shear factor. This m value may be, in turn, cross-indexed, together with the percent deformation, $\Delta T$, value found for the particular test specimen, as at 13, in a computer readout listing of precalculated values to find the ratio of the total loading, applied to the specimen to the true loading. This final factor is written $P/\delta_o$ and constitutes the ratio of the total load or pressure exerted by the compression testing machine, or in other words, the load actually impressed on the test specimen by the compression machine die members or, in other words, by the previously noted platen members 11 and 12, (see FIG. 1) to the true flow stress of the specimen material, the latter factor being that intended to be determined for the selected material. It has been found to be always greater than 1 and usually less than 5. Since it is the ratio of the total pressure with the friction component to the true pressure without the friction component, the latter value may be found simply by dividing the indicated pressure (on the compression machine) by this factor.

A typical ring test was performed on the previously referred to test specimen-ring member 13 of FIGS. 2 and 2a. The said member 13, which was made from an aluminum alloy and initially incorporated the aforementioned 6:3:1 ratio, was tested at room temperature at 1"/1" minute strain rate, with the platen members 11 and 12 being dry polished. Initially, test specimenring member 13 was machined to the desired configuration and measured with a tool maker's microscope and micrometer to register the accurate initial dimensions thereof, of a thickness or height equal to 0.125 inches, an outside diameter, O.D., equal to 0.7448 inch and an inside diameter, I.D., equal to 0.3757 inch, which dimensions were very close to the normal ¾ × ⅜ × ⅛ inches referred to hereinbefore. The specimen 13 was then centered on the platen members, such as is indicated at 11, 12 in FIG. 1, of a Baldwin tension-compression machine, and thereafter loaded to 20,000 pounds and then unloaded. Next, the final or permanently deformed dimensions of the test specimenring member 13 were accurately measured, again, with a tool maker's microscope and micrometer, and found to be 0.062 inch for its thickness or height, 0.9588 inch for its outside diameter (O.D.), in a first direction and 0.9486 inch for its O.D. in a second direction, and 0.3081 inch for its inside diameter (I.D.) in one direction and 0.2970 inch for its I.D. in a second direction. Thus, the deformed shape of the test specimen 13, such as that schematically depicted in FIGS. 3 and 3a, was slightly elliptical in configuration, since it included both major and minor axes as indicated above.

From the above data, therefore, the percent deformation, $\Delta T$, was calculated by the previously-referred to formula as follows:

$$\text{Percent } \Delta T = \frac{\text{Original thickness} - \text{Final thickness}}{\text{Original thickness}} \times 100$$

or, in other words, the $$\text{Percent } \Delta T = \frac{0.125 - 0.062}{0.125} \times 100 = 50.4$$

In the above equation, both the original and final thicknesses were actually measured before and after deformation of the test specimen 13 under the aforementioned 20,000 pound load.

As previously indicated, the required die friction component precentage, percent $\Delta D$, may be computed from the change in shape, or, in other words, the change in thickness of the specimen 13 by the aforementioned formula as follows:

$$\text{Percent } \Delta D = \frac{\text{Original I.D.} - \text{Final I.D.}}{\text{Original I.D.}} \times 100$$

or, in other words, the $$\text{Percent } \Delta D = \frac{0.3757 - 0.3026}{0.3757} \times 100 = +19.5$$

Again, both the original and final inside diameters were accurately measured. In this connection, it is noted that, since the final hole shape was elliptical in form for the particular specimen tested, an average diameter was used for the final I.D. figure.

The contact area involved in the foregoing compression technique was calculated by subtracting the area of the specimen with the final I. D. from the area thereof with the final O.D. In this regard, it is noted that, since the deformed state of the specific test specimen-ring member 13 was slightly elliptical in configuration, the formula for the area of an ellipse is applicable to determine the area with both the final I.D. and the final O.D. This formula involves the multiplication of the following factors:

Major Axis × Minor Axis × π/4

In other words:

For the Final O. D., the correct computation would be:

0.9588 × 0.0486 × 0.785 = 0.7130 sq inches.

For the Final I. D., the computation would be:

0.3081 × 0.2970 × 0.785 = 0.0720 sq inches.

Therefore, the involved contact area would be equal to 0.7130 sq inches less 0.0720 sq inches or, in other words, 0.6410 sq inches.

Then, the total pressure required both to overcome the die friction and to compress the test specimen 13 to the previously-computed 50.4 percent deformation may be determined from the following formula:

$$P = \frac{\text{Total load}}{\text{Contact area}} = \frac{20,000 \text{ lbs.}}{0.6410 \text{ in.}^2} = 31,200 \text{ p.s.i.}$$

The above value is not, however, the desired true stress value of the selected metal or alloy. The latter may be determined by dividing this computed value of total pressure of 31,200 psi by the previously referred to $P/\delta_o$, which is the ratio of the average forging or deformation pressure, P, on the ring element, as at 13, to the actual material flow stress, $\delta_o$. Both $P/\delta_o$ and the shear factor, $m$, are determinable from the use of a chart and computerized tables based upon the solution of equations previously developed and described by B. Avitzur in a 1968 publication by McGraw-Hill, Inc. of New York in an article entitled "Metal Forming: Process and Analysis," which involve the problem of the axial compression of ring-shaped specimens between flat dies. Naturally, the already computed values of $\Delta D$ and $\Delta T$ are utilized in these equations. In this case, the $\Delta D$ and $\Delta T$ values used for the specimen 13 are the previously mentioned +19.5 percent and 50.4 percent, respectively. From a cross-index of the latter values, in the aforesaid tables, an m value of 0.18 may be selected. Therefore, from this m value equal to 0.18, the aforesaid $p/\delta_o$ ratio may be determined as being equal to 1.42 from the same tables. As will be more definitely indicated hereinafter this factor of 1.42 is utilized to compute the material flow stress, $\delta_o$, of the specimen 13. A number of such results for different deformation loads have been computed in accordance with the aforementioned Avitzur's solutions and then depicted in the graphs of FIG. 6.

The above-noted Avitzur's solutions are based on the following assumptions:
1. The ring material obeys Mises' stress-strain rate laws, thereby implying no strain hardening effect, no elastic deformation, and no volumetric change.
2. At the die-ring interface, for a given die and material under constant surface and temperature conditions, there is a constant friction factor, $m$, such that the interfacial shear stress, $\tau$, is given by: $\tau = m(\delta_o/\sqrt{3})$, where $\delta_o$ is the flow stress of the ring material, as has been previously indicated.
3. The ring is sufficiently thin for the effect of the surface frictional retardation stresses to be transmitted uniformly throughout the thickness of the ring, i.e., no barrelling.

Table I, set forth hereinafter, constitutes a detailed tabulation of several examples of different ring geometries and deformation loads tested and computed in accordance with Avitzur's theoretical solutions.

TABLE I (a) Deformation of rings of initial geometry 6:3:0.5

| Material | Lubrication | Deformation (%) | Load (pounds) | P (ksi) | m | $\delta_o$ (ksi) |
|---|---|---|---|---|---|---|
| Copper | Dry | 6.4 | 20,000 | 57.7 | 0.19 | 43.7 |
| | Teflon | 28.6 | 25,000 | 55.0 | 0.04 | 48.2 |
| | | 30.8 | 30,000 | 65.6 | 0.09 | 52.0 |
| | | 40.7 | 40,000 | 72.4 | 0.09 | 54.4 |
| | | 46.5 | 50,000 | 82.0 | 0.09 | 59.0 |

(b) Deformation of rings of initial geometry 6:3:1

| Material | Lubricant | | | | | |
|---|---|---|---|---|---|---|
| Copper | Dry | 12.0 | 20,000 | 55.9 | 0.20 | 45.8 |
| | | 30.1 | 30,000 | 65.6 | 0.23 | 49.7 |
| | | 48.0 | 50,000 | 80.3 | 0.27 | 51.1 |
| | Teflon | 36.0 | 30,000 | 59.7 | 0.09 | 50.6 |
| | | 48.0 | 40,000 | 64.4 | 0.08 | 53.6 |
| | | 56.5 | 50,000 | 64.3 | 0.08 | 51.4 |
| Steel | Dry | 16.3 | 30,000 | 81.6 | 0.14 | 69.2 |
| | | 25.4 | 40,000 | 92.5 | 0.17 | 74.6 |
| | | 34.4 | 50,000 | 104.5 | 0.16 | 82.3 |
| | Teflon | 18.9 | 30,000 | 74.5 | 0.03 | 69.9 |
| | | 29.4 | 40,000 | 85.5 | 0.03 | 80.7 |
| | | 39.3 | 50,000 | 97.4 | 0.09 | 81.7 |
| Aluminum | Dry | 22.3 | 10,000 | 24.6 | 0.29 | 18.9 |
| | | 50.4 | 20,000 | 31.2 | 0.18 | 22.0 |
| | | 58.4 | 35,000 | 43.0 | 0.24 | 24.7 |
| | Teflon | 27.0 | 10,000 | 23.6 | 0.06 | 21.2 |
| | | 33.0 | 10,000 | 22.0 | 0.07 | 17.7 |
| | | 55.5 | 20,000 | 24.2 | 0.06 | 23.0 |

The theoretical solutions by Avitzur mentioned hereinbefore may be summarized as follows:

When $R_n \leq R_i$, and $$m \frac{R_o}{T} \leq \frac{1}{2\left(1-\frac{R_i}{R_o}\right)} \ln \left[\frac{3\left(\frac{R_i}{R_o}\right)^2}{1+\sqrt{1+3\left(\frac{R_i}{R_o}\right)^4}}\right]$$

Then $$\frac{P}{\delta_o} = \frac{1}{1-\left(\frac{R_i}{R_o}\right)^2} \left[\sqrt{1+\frac{1}{3}\left(\frac{R_n}{R_o}\right)^4} - \sqrt{\left(\frac{R_i}{R_o}\right)^4 + \frac{1}{3}\left(\frac{R_n}{R_o}\right)^4}\right.$$
$$\left. + \frac{2}{3\sqrt{3}} m \frac{R_o}{T}\left\{1+\left(\frac{R_i}{R_o}\right)^3\right\}\right]$$

Where $$\left(\frac{R_n}{R_o}\right)^2 = \frac{\sqrt{3}}{2} \cdot \frac{1-\left(\frac{R_i}{R_o}\right)^4 X^2}{X(X-1)\left[1-\left(\frac{R_i}{R_o}\right)^4 X\right]}$$

and $$X = \left\{\frac{R_o}{R_i} \exp\left[-m \frac{R_o}{T}\left(1-\frac{R_i}{R_o}\right)\right]\right\}^2$$

When $R_i \leq R_n \leq R_o$, and $$m \frac{R_o}{T} \geq \frac{1}{2\left(1-\frac{R_i}{R_o}\right)} \ln \left[\frac{3\left(\frac{R_o}{R_i}\right)^2}{1+\sqrt{1+3\left(\frac{R_o}{R_i}\right)^4}}\right]$$

or when $m \frac{R_o}{T} > \frac{1}{2}$

Then $$\frac{P}{\delta_o} = \frac{1}{1-\left(\frac{R_i}{R_o}\right)^2}\left[\sqrt{1+\frac{1}{3}\left(\frac{R_n}{R_o}\right)^4} - \sqrt{\left(\frac{R_i}{R_o}\right)^4 + \frac{1}{3}\left(\frac{R_n}{R_o}\right)^4}\right.$$
$$\left. + \frac{2}{3\sqrt{3}} m \frac{R_o}{T}\left\{1+\left(\frac{R_i}{R_o}\right)^3 - 2\left(\frac{R_n}{R_o}\right)^3\right\}\right]$$

where $R_n/R_o$ is found by successive approximations from $$2m\frac{R_o}{T}\left(1+\frac{R_i}{R_o}-2\frac{R_n}{R_o}\right)$$
$$+\ln\left\{\left(\frac{R_i}{R_o}\right)^2\left[\frac{\left(\frac{R_n}{R_o}\right)^2+\sqrt{3+\left(\frac{R_n}{R_o}\right)^4}}{\left(\frac{R_n}{R_o}\right)^2+\sqrt{3\left(\frac{R_i}{R_o}\right)^4+\left(\frac{R_n}{R_o}\right)^4}}\right]\right\} = 0$$

where, $\delta_o$ = flow stress of ring material.

$P$ = average forging pressure on ring.

$\tau$ = average shear stress at die/ring interfaces.

$m$ = interface friction factor.

$R_i$ = internal radius of ring.

$R_o$ = external radius of ring. $R_n$ = radius of metal flow divide (no-slip radius) in ring.

By use of the foregoing Avitzur's equations, values of $P/\delta_o$ may be computed, as has been solved by the unique method taught by the present invention, at the instant deformation ceases in terms only of the specific ring geometry and the interfacial friction or shear factor, $m$. In the said equations, neither the basic yield or flow stress of the material, $\delta_o$, nor the interfacial shear stress, $\delta$, appear in terms of independent absolute values. They actually appear only as the ratio, $m$. In this regard, it has been further assumed that this ratio, $m$, remains constant for the material and deformation conditions. Thus, if the analysis is performed for a small increment of deformation, where both $\delta_o$ and $\tau$ could be assumed to be approximately constant for this increment, the solution would, therefore, be considered valid. Then, considering the shear or friction factor, $m$, to be constant throughout the entire deformation, the mathematical analysis discussed herein may be justifiably continued in a series of small deformation increments using the final ring geometry from one increment as the initial geometry for the subsequent increment and so on. Furthermore, so long as the ratio of the interfacial shear stress, $\tau$, and the material flow stress, $\beta_o$, remain constant strain hardening of the ring material during its deformation would be of no consequence, provided that the increase in work hardening in any one single deformation increment could be neglected.

The above-described Avitzur's equations have been solved in the present invention through means of computer solutions for several different starting ring geometries over the complete range of $m$ values from zero to unity. Such computer solutions have also yielded values for the ratio, $P/\delta_o$, for the various values of $m$ and amounts of deformation. Therefore, by using ring specimens which are sufficiently thin to validate Avitzur's assumption, the aforesaid computer solutions, which have been tabulated in the table previously referred to, have been utilized, as noted hereinabove, to determine the previously mentioned value of 1.42 for the ratio $p/\delta_o$. Therefore, by using the above figure of 1.42 for the $P/\delta_o$ ratio and continuing the calculations of flow for the metal alloy of the said test specimen 13, the true flow stress thereof is found from the following equation:

$$\frac{\text{Total pressure}}{P/\delta_o} = \frac{31,200}{1.42} = 22,000 \text{ p.s.i.}$$

The aforesaid calculation of 22,000 psi represents the true flow stress of the previously-described ring-shaped test specimen 13 of FIGS. 2 and 2a and 3 and 3a, the latter representing the deformed conditions thereof. To construct a compressive true stress-strain curve, it is only necessary to obtain similar data points from test specimens of other ring geometries. In this connection, the data point obtained from the aforesaid calculations for the specimen 13 lies at the intersection representing a stress of 22,000 psi and a deformation of 50.4 percent. This point is indicated at the arrow marked D in the graphs of FIG. 6. This is for the aluminum test specimen/ring member 13, which was tested dry or, in other words, while unlubricated, and which further incorporated the 6:3:1 shape ratio. By repeating the inventive procedure, either with different loadings and the same test specimen, or, alternatively, with different ring specimens, with and without lubrication, other points, computed with the assistance of the aforementioned computerized tables, may be obtained as for example, those indicated at E and F, again, for the unlubricated aluminum test specimen 13.

In regard to the above-referred to alternative test specimens, flow stress values may be determined in the same manner as previously described for test specimen 13 by means of the improved ring-test technique of the present invention, by using other ring members having the same approximate outside and inside diameters of 0.750 inch and 0.375 inch and varying in thickness or height. In this regard, the initially described specimen 13 of FIGS. 2 and 2a and 3 and 3a incorporated an initial thickness or height of approximately 0.125 inch, as was previously indicated. Another unlubricated-type of aluminum ring member also used for test purposes had an initial ring geometry which included a shape ratio of 6:3:2 or, in other words, incorporated an outside diameter of approximately 0.750 inch, an inside diameter of about 0.375 inch and a thickness or height of about 0.250 inch. Three computed data points for this configuration are indicated respectively at G, H and I in the aforementioned FIG. 6. A still further aluminum and unlubricated test specimen incorporated a shape ratio 6:3:0.5 formed from the same outside and inside diameters of 0.750 inch and 0.375 inch, respectively, but with a height or thickness that was even further reduced to a value of 0.062 inch. Three or more data points computed for the latter configuration by the already-described improved technique of the present invention are illustrated at J, K and L in the graphs of FIG. 6 for the copper specimen tested. This 6:3:2 shape ratio was also tested for a graphite lubricated test specimen, and data points computed and plotted therefor, as is indicated for example, at M, N and O, for the steel specimen depicted in the aforementioned FIG. 6. Further, a 6:3:1 shape ratio teflon lubricated copper specimen was similarly tested and several data points computed therefor and plotted, as indicated for example, at the points P, Q and R. Finally, a plurality of data points were computed by use of the inventive technique as a result of testing a 6:3:0.5 shape teflon lubricated specimen and plotted, as is indicated for example, at S, T and U for the copper ring member.

Figure 5:
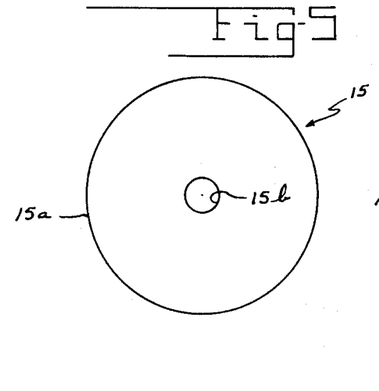
Figure 5A:
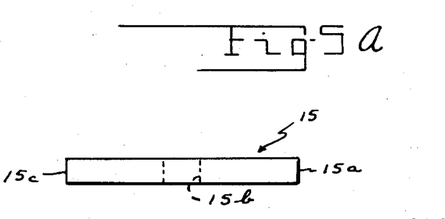

In order to satisfy the previously noted assumption of a "thin" specimen, required for the Avitzur solution, it has been determined that the ring thickness may vary to a degree which is dependent upon the actual friction condition existing at the interfacial plane. In this connection, under conditions of maximum friction, such as is the case with the unlubricated test specimen 13 of FIGS. 2 and 3, the largest specimen height or thickness usable was obtained with rings having a geometry incorporating a shape ratio of 6:3:0.5, or, in other words, one similar to that depicted at 15 in FIGS. 5 and 5a, for example. On the other hand, under conditions of low friction, it is considered that somewhat thicker specimens are usable, such as the previously-described specimen 13 of FIGS. 2 and 3.

In testing the aforementioned test specimen-ring members, the materials used were commercially pure aluminum (such as with the previously described specimen 13 of FIG. 2), O.F.H.C. copper and 1018 steel. The first two materials were used in the partially cold worked condition whilst the 1018 steel was given a normalizing treatment before use. The foregoing tests were run to compare data on the flow stress behavior of selected metals and/or alloys, as obtained from use of the improved technique of the present invention, with similar data obtained from a prior method, developed by N. H. Polakowski and described in a 1949 publication of the J. Iron Steel Institute, in an article entitled "The Compression Test in Relation to Cold Rolling." Deformation was carried out in a series of tests involving the present invention between polished dies on a 50,000 pound capacity Tinius Olsen testing machine operating at a constant crosshead speed of 0.1 ins/min. A roll-type recorder fitted to the testing machine allowed continuous monitoring of load and specimen deformation when coupled to two standard displacement gauge units mounted diametrically opposite between the two dies.

The flow stress behavior of the three materials was first obtained using the aforementioned Polakowski technique involving the compression of relatively tall cylinders, the initial dimensions of which were 0.50 inch in diameter of 1.00 inch in height, and then periodically remachining to remove any barrelling tendency thereof in order to prevent the generation of a triaxial state of stress. These cylinders were lubricated with dry graphite film, as were the dies, and given an approximately twenty percent reduction in height. The specimens were then carefully machined back to a height-diameter ratio of 2, relubricated and compressed to a further twenty percent reduction. This process was repeated until the total height reduction achieved was 60 percent. The load applied versus the reduction in height data for each step was then recalculated into stress versus reduction in height values by taking into account the progressive increase in area during deformation. Three of these determinations were made for each material and the results thereof plotted on the aforementioned graphs of FIG. 6, and is generally indicated at the reference numerals 16, 17, 18, each of which representing the best single curve drawn through each triple set of points and assumed to be the basic flow stress behavior, respectively, for the aluminum, copper and steel specimen material used in the tests.

Figure 3:
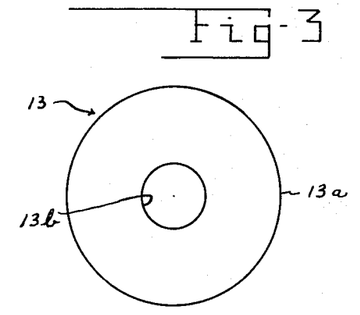
FIGS. 3 and 3a respectively illustrate additional enlarged plan and side elevational views, showing the condition of the test specimen of FIGS. 2 and 2a after having been subjected to a predetermined compression load.
Figure 3A:
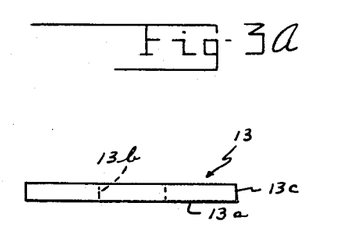

Determination of the flow stress values by means of the novel ring-test technique of the present invention was accomplished in the unique manner, as hereinbefore specifically described with particular reference to the illustrative example given in connection with the test specimen-ring member 13 of FIGS. 2 and 3, on three separate specimens comprising the same aluminum, copper and steel material used with the Polakowski tests. All specimens initially incorporated the same outside and inside diameter of approximately ¾ inch and ⅜ inch. In addition, a varying thickness or height from 1/16 inch to ⅜ inch to ¼ inch was used. Moreover, three different frictional conditions of no lubrication, lubrication with a dry graphite film, and, finally, lubrication with a teflon sheet was also employed. The illustrative example of the ring member 13 of FIGS. 2 and 3 involved, as noted hereinbefore, the aluminum material, without lubrication. During these various tests the ring member-specimens were compressed over a range of deformation and the deformation loads were noted. The outer and inner diameters thereof were precisely measured with a toolmaker's microscope and micrometer in several different directions and the average thereof recorded, thus allowing calculations of both the contact area involved and the average deformation pressure. The values obtained in the same manner previously specified for the ring member 13 of FIGS. 2 and 3 have been listed in the aforementioned Table I and graphically displayed in the aforementioned FIG. 6, for each of the previously referred to materials and lubrication conditions, as has been previously indicated.

Figure 6:
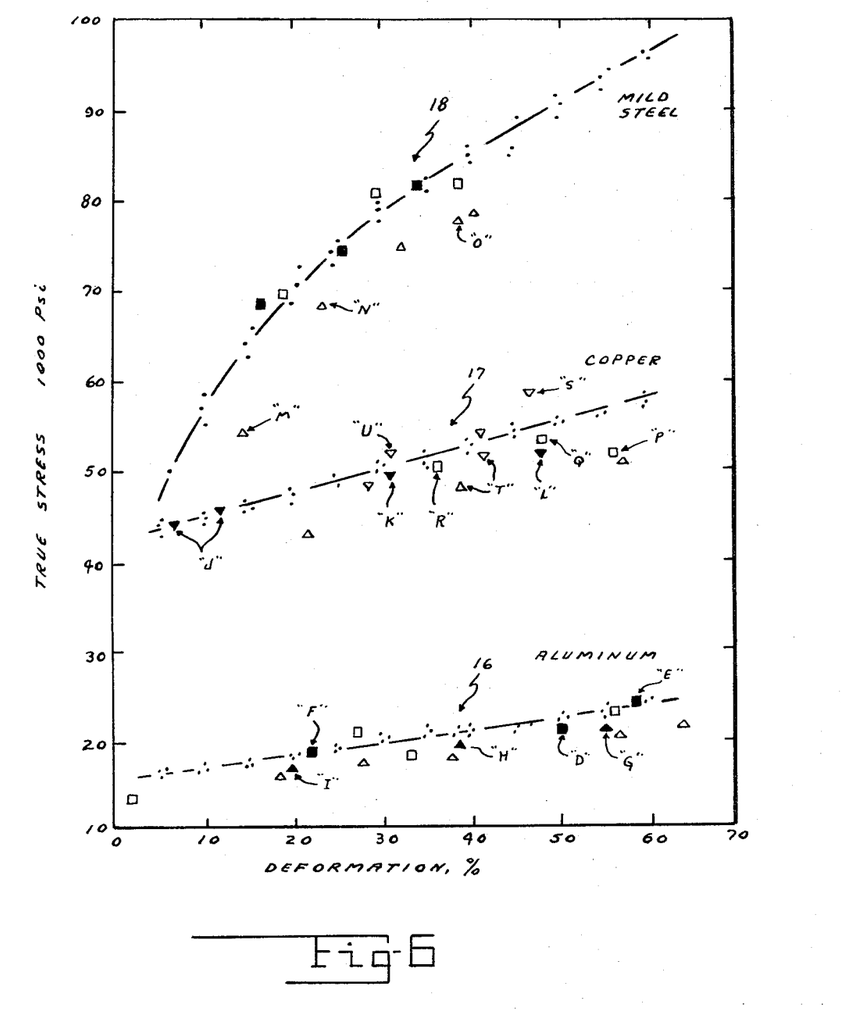
FIG. 6 depicts a graph representing variations in true stress values for a range of deformation, for each of three different materials in both lubricated and unlubricated conditions and for different ring geometries, using the ring compression technique of the present invention and further providing a comparison with a prior technique.

A study of the flow stress measurements depicted on the aforementioned FIG. 6 shows that there exists a random scatter for the computed points when using the 6:3:1 and 6:3:0.5 ratio rings, with, however, the majority of the said points, as for example those indicated at the previously referred to determinations marked D, E and F for the 6:3:1 shape ratio, as well as these computed points indicated at G, H and I for the 6:3:0.5 shape ratio, falling within, and therefore agreeing favorably with, the scatter level obtained with the Polakowski technique. For example, note the curve 16. A similar situation exists for the Polakowski curves indicated at the reference numerals 17 and 18. This scatter is considered to exist because of the estimation of the final specimen contact area from the averages of several measurements of both inner and outer diameters. However, the true flow stress values obtained by means of the improved method of the present invention were, as clearly seen in the said FIG. 6, consistently lower than those obtained with the Polakowski technique, when using rings of an initial geometry of 6:3:2. This suggests that, with the latter geometry, the theoretical analysis may be overestimating the interfacial friction effects.

Figure 7:
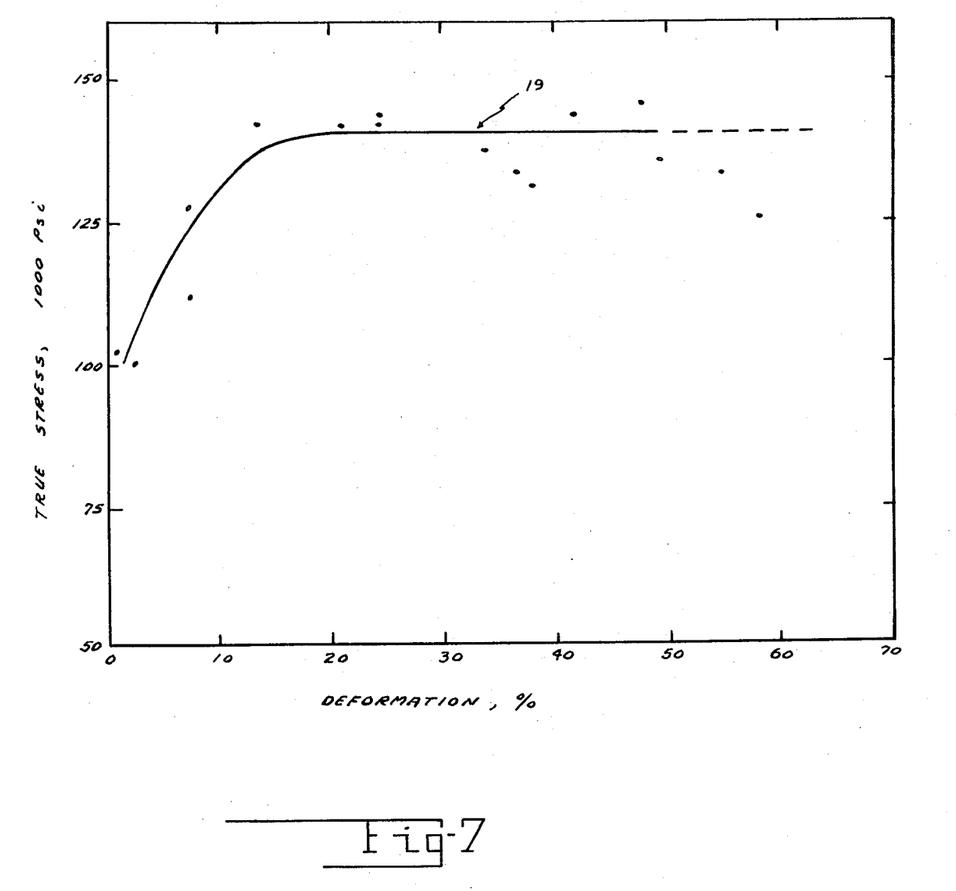
FIG. 7 is another graph representing variations in true stress values for a range of deformation for a fourth type of material using the inventive ring compression technique.

A further application of the present method involved the production of still another material; namely, Zircaloy 4 tubing by cold deformation processes where a knowledge of the flow stress behavior thereof was required. Ring test specimens of 0.750 inch O.D. × 0.375 inch I.D. × 0.125 inch height were machined from Zircaloy 4 strip. Comparison of these rings was performed at ambient temperature between polished flat dies at an average strain rate of $10^{-3}$ sec$^{-1}$ and using Johnson's wax as a lubricant. Sequential compression of a number of test specimens, in the manner outlined previously, allowed the generation of the data depicted in FIG. 7, the best curve thereof being illustrated generally at 19.

Figure 4:
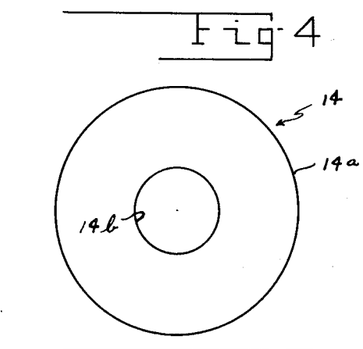
Figure 4A:
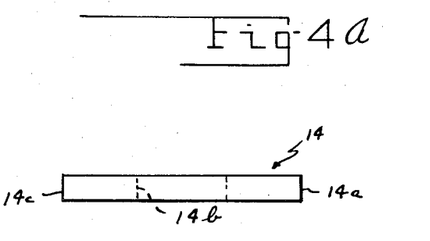

The improved technique described hereinbefore, as supported by the described tests, illustrates that realistic data on the basic flow properties of a material deformed under conditions typical of many metal working operations, can be relatively quickly and accurately generated by the sue of the novel and improved technique of the present invention as is exemplified by the following claims attached hereto. Thus, although the ring-shaped test specimen 14, which is illustrated in FIGS. 4 and 4a as incorporating an outside diameter at 14a, an inside diameter at 14b, and a thickness or height at 14c, as well as the previously referred to test specimen 15 of FIGS. 5 and 5a, both had vastly differing friction conditions and loadings, calculations by use of the present novel technique revealed that both of said specimens 14, 15 exhibited the same true stress.

As noted hereinbefore, the second application of the present invention involves the use of the ring-shaped test specimen as a ring load cell for measuring loads applied to metallic materials during the testing thereof. It is only necessary that the material selected be subject to plastic deformation as previously mentioned. Again, ring-shaped specimens, such as that shown at 13 in FIGS. 2 and 2a, for example, were tested with various shape ratios, i.e., with different outside-to-inside diameters-to-thickness ratios. These specimens were machined from material of known flow properties, or, in other words, where the previously described material flow stress factor, $\delta_o$, forming part of the ratio, $P/\delta_o$, has been already determined for the selected test material. Once again, the said specimens were placed between flat platen members, such as that previously noted at the reference numerals 11 and 12 in FIG. 1, and an unknown compressive load applied thereto until permanent deformation of the test specimen, as at 13, occurs. Thereafter, as previously described hereinbefore, the permanently deformed dimensions of the specimen may be accurately measured and compared with the original, nondeformed dimensions thereof. From the previously listed solutions by Mr. B. Avitzur, and from the aforementioned accurate measurement of the change in both inside diameter and thickness from the use of a toolmaker's microscope and micrometer, both the previously noted interface friction factor, $m$, denoting the friction measurement on the flat faces of the particular test specimen, as at 13, and the, $P/\delta_o$, ratio may be calculated. Actually, these calculations of $m$ and $P/\delta_o$ may again be preferably obtained from tables based on computerized solutions of Avitzur's equations for a number of different test specimens having various shape ratios. With a known material flow stress, $\delta_o$, having been already determined for the selected test specimen-material, the pressure, $P$, in the $P/\delta_o$ ratio may, of curse, be quickly computed. If, for example, the previously used compressive load of 20,000 psi was not initially known and it was desired, the present aluminum alloy ring load cell-test specimen, such as that previously described at the reference numeral 13 in FIG. 2, could be positioned between the flat platen members 11 and 12 (FIG. 1) and then subjected to this initially unknown 20,000 psi compressive load or force. In this event, the same changes in both thickness and inside diameter would be present. Thus, with this identical permanent deformation occurring, the same value for the ratio of $P/\delta_o$ of 1.42 would naturally be found in the aforementioned computerized-determined tables. Moreover, with the identical dimensional changes present, the involved contact area of the test specimen or ring load cell 13 would likewise be equal to the previously computed 0.6410 sq. inches. Therefore, with a known material stress value, $\delta_o$, for example, of 22,000 psi for the aluminum alloy material of the test specimen 13, the pressure, $P$, of the $P/\delta_o$ ratio, would be approximately equal to the previously noted 31,200 psi. Of course, the total compression load or force would be equal to the pressure, $P$, of 31,200 psi times the aforementioned contact area of 0.6410 sq. inches, or, in other words, it would be equal to the initially unknown 20,000 psi. Naturally, other dimensional changes would indicate a different compressive force.

The foregoing load-determining method involving use of the simplified and yet novel ring load cell 13 of the present invention may be uniquely and equally applicable in the same manner in the conduct of tests of various ring-shaped specimens of a variety of different shape ratios, in processing operations, and/or in the actual service use thereof.

We claim:

1. In a combined test method for generating true flow stress-strain data for mathematically predicting the behavior of a selected metallic material under compression by a known load, and for determining the compressive load applied thereto when the flow properties thereof are known, the steps comprising; initially selecting and fabricating a relatively thin and flat ring test specimen having an accurately measured and predetermined initial shape ratio selected from the material to be tested; subsequently applying a compressive force to, and permanently deforming said test specimen; and thereafter precisely measuring the permanent deformation imparted to said test specimen by the compressive force applied thereto, said deformation consisting of, and effecting a permanent change in the initial shape ratio of the test specimen to thereby generate essential data for application to, and mathematical analysis by an existing equation adapted to compute the true flow stress of the material under compression when the deformation load applied thereto is known, and to determine an unknown deformation load being applied to the test specimen when the latter has known flow stress properties, the step of applying a compressive force including mounting the test specimen between a pair of flat die members, and the further step of precisely measuring the deformation being imparted to said test specimen comprising separately determining the friction component at, and resulting from, the die member/specimen interface from the specific measurement and calculation of both the percentages of change in the initial shape ratio-inside diameter and thickness portions of the test specimen as a result of the compression thereof; thereafter selecting the actual friction component value corresponding to the point of intersection between and represented by said percentages of change in the test specimen inside diameter and thickness portions from a precalculated curve; and subsequently deducting said friction component from the total compression load to thereby obtain and ensure the isolation and thus the determination of the true normal load being impressed upon the test specimen; said step of precisely measuring the deformation imparted to said test specimen further including the additional step of measuring the final contact area between said die members and said test specimen to thereby enable the mathematical computation of either the true stress, for a known load, or the compressive force or load being imparted thereto, when the test specimen-material flow stress is known.

2. In a combined test method for generating true flow stress-strain data for mathematically predicting the behavior of a selected metallic material under compression, and for determining the compressive force applied thereto when the flow properties of the selected material are known, the steps comprising; initially fabricating a relatively thin and flat ring test specimen having a predetermined initial shape ratio and being selected from the material to be tested; subsequently applying a compressive force to, and being sufficient to permanently deform said test specimen; and thereafter precisely measuring the permanent deformation imparted to said test specimen by the compressive force applied thereto, said deformation effecting a permanent change in the initial shape ratio of the test specimen to thereby generate essential data for application to, and mathematical analysis by an existing equation for computing the true flow stress of the material under compression when the load applied thereto is known, and for determining an unknown deformation load being applied when the material flow stress of the test specimen is known; the initial predetermined shape ratio of said ring test specimen comprising generally an outside diameter to inside diameter to height ratio in which the outside diameter portion is made substantially greater than the height portion thereof; and the step of precisely measuring the deformation imparted to said test specimen including the further steps of determining the precise dimensional changes respectively in the test specimen-inside diameter and thickness portions from which the die friction component resulting at the die member/specimen interface may be computed, said component being utilizable in the determination of both the test specimen-material flow stress for a known compressive force and the compressive force itself when the flow stress of the selected material under test is given.

* * * * *